United States Patent
Peri et al.

(10) Patent No.: US 10,579,162 B2
(45) Date of Patent: Mar. 3, 2020

(54) SYSTEMS AND METHODS TO CORRECT A VEHICLE INDUCED CHANGE OF DIRECTION

(71) Applicants: Christopher A. Peri, Mountain View, CA (US); Ciaran Rochford, Bellevue, WA (US)

(72) Inventors: Christopher A. Peri, Mountain View, CA (US); Ciaran Rochford, Bellevue, WA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 225 days.

(21) Appl. No.: 15/459,916

(22) Filed: Mar. 15, 2017

(65) Prior Publication Data

US 2017/0277280 A1 Sep. 28, 2017

Related U.S. Application Data

(60) Provisional application No. 62/312,860, filed on Mar. 24, 2016.

(51) Int. Cl.
*G06F 3/0346* (2013.01)
*G02B 27/01* (2006.01)
*G06F 3/01* (2006.01)

(52) U.S. Cl.
CPC ....... *G06F 3/0346* (2013.01); *G02B 27/0179* (2013.01); *G06F 3/012* (2013.01); *G02B 2027/0183* (2013.01)

(58) Field of Classification Search
CPC ........ G02B 27/0179; G02B 2027/0183; G06F 3/011; G06F 3/012; G06F 3/0346
See application file for complete search history.

(56) References Cited

U.S. PATENT DOCUMENTS 5,742,264 A * 4/1998 Inagaki ............... G02B 27/017
345/7
6,408,257 B1 6/2002 Harrington
(Continued)

FOREIGN PATENT DOCUMENTS

EP 2630447 8/2013
EP 2784632 10/2014
(Continued)

OTHER PUBLICATIONS

Dual Sensor Filtering for Robust Tracking of Head-Mounted Displays, University of Bath.
(Continued)

*Primary Examiner* — Amr A Awad
*Assistant Examiner* — Stephen A Bray
(74) *Attorney, Agent, or Firm* — John King

(57) ABSTRACT

A method to correct for a vehicle induced change of direction in an electronic device is described. The method comprises determining a first center pose of the electronic device, and determining when a motion of the electronic device is caused by a vehicle. At least one key point within a scene can be tracked, using a sensor in conjunction with computer vision operating on a processor, to determine a second center pose. It is then determined whether the second center pose is within a tolerance with respect to the first center pose; and the second center pose is adjusted when there is a difference between the second center pose and the first center pose.

21 Claims, 6 Drawing Sheets

(56) References Cited

U.S. PATENT DOCUMENTS

| | | |
|---|---|---|
| 7,155,673 B2 | 12/2006 | Stewart et al. |
| 7,312,766 B1 | 12/2007 | Edwards |
| 7,315,635 B2 | 1/2008 | Oosawa |
| 7,627,197 B2 | 12/2009 | Aoyama |
| 8,430,510 B2 | 4/2013 | Sugio |
| 8,890,896 B1 | 11/2014 | Tseng |
| 9,025,252 B2 | 5/2015 | Lewis |
| 9,109,905 B2 | 8/2015 | Hsu |
| 9,189,858 B2 | 11/2015 | Svanholm et al. |
| 9,202,280 B2 | 12/2015 | Wu |
| 9,244,539 B2 | 1/2016 | Venable et al. |
| 9,274,340 B2 | 3/2016 | Lyons |
| 9,285,872 B1 | 3/2016 | Raffle et al. |
| 9,311,718 B2 | 4/2016 | Scavezze |
| 9,316,833 B2 | 4/2016 | Border |
| 9,824,498 B2 * | 11/2017 | Mallinson ............... G02B 26/10 |
| 10,217,435 B2 * | 2/2019 | Chae ...................... G09G 5/003 |
| 2002/0103617 A1 | 8/2002 | Uchiyama et al. |
| 2010/0045701 A1 | 2/2010 | Scott et al. |
| 2011/0170067 A1 | 7/2011 | Sato |
| 2015/0092048 A1 | 4/2015 | Brunner et al. |
| 2015/0100179 A1 | 4/2015 | Alaniz |
| 2015/0213778 A1 | 7/2015 | Moravetz |
| 2015/0235631 A1 | 8/2015 | Tanaka |
| 2015/0241969 A1 | 8/2015 | Elangovan |
| 2015/0273179 A1 | 10/2015 | Krueger |
| 2015/0279050 A1 | 10/2015 | Yang |
| 2015/0294505 A1 | 10/2015 | Atsmon |
| 2016/0048964 A1 | 2/2016 | Kruglick |
| 2016/0070966 A1 | 3/2016 | Yang |
| 2017/0050743 A1 * | 2/2017 | Cole ...................... B64D 43/00 |

FOREIGN PATENT DOCUMENTS

| | | |
|---|---|---|
| WO | 2014069090 | 8/2014 |
| WO | 2015004916 | 1/2015 |
| WO | 2015126443 | 8/2015 |

OTHER PUBLICATIONS

Miniature 6-DOF Inertial System for Tracking HMD's, Eric Foxlin, Michael Harrington and Yury Alshuler, Apr. 13, 1989.

Correcting Drift, Head and Body Misalignments Between Virtual and Real Humans.

Changyu He, et al., An Inertial and Optical Sensor Fushion Approach for Six Degree-of-Freedom Pose Estimation, Senors, 2015.

* cited by examiner

SYSTEMS AND METHODS TO CORRECT A VEHICLE INDUCED CHANGE OF DIRECTION

RELATED APPLICATIONS

This application claims priority to provisional Application Ser. No. 62/312,860, filed on Mar. 24, 2016 which is incorporated by reference herein.

FIELD OF THE INVENTION

An embodiment of the present invention relates generally to portable electronic devices, and in particular, to systems for and methods of correcting a vehicle induced change of direction in an electronic device.

BACKGROUND OF THE INVENTION

Virtual reality devices and other head-mounted display (HMD) devices that do not employ external systems for tracking rely on the sensors in the HMD or in a device used in the HMD for head orientation tracking. Many HMD devices like it use a mobile device to render a virtual or augmented scene, and thus rely on the sensors in the HMD or mobile device for head orientation tracking. However, when riding in any type of moving vehicle that experiences a change in direction, the HMD sensors may incorrectly report this change of direction as a head rotation. For example, when a car with a passenger wearing a head-mounted display (HMD) makes a turn to the left, the view of the HMD rotates to the right incorrectly because of the car's turn. That is, the HMD view of the scene would be shifted to the right as the car makes a left turn. To compensate, the user would turn their head until the turn stops, the user cannot turn their head any further, or the user resets the HMD's alignment.

Accordingly, devices and methods that correct for a vehicle induced change of direction in an electronic device are beneficial.

SUMMARY OF THE INVENTION

A method to correct for a vehicle induced change of direction in an electronic device is described. The method comprises determining a first center pose of the electronic device, and determining when a motion of the electronic device is caused by a vehicle. At least one key point within a scene can be tracked, using a sensor in conjunction with computer vision operating on a processor, to determine a second center pose. It is determined whether the second center pose is within a tolerance with respect to the first center pose; and the second center pose is adjusted when there is a difference between the second center pose and the first center pose.

An electronic device is also described. The electronic device comprises a display, a sensor configured to track at least one key point within a scene, and a processor coupled to the display and the sensor. The processor is configured to determine when a motion of the electronic device is caused by a vehicle. The processor also tracks, using the sensor in conjunction with computer vision operating on the processor, the at least one key point within the scene to determine a second center pose. The processor determines whether the second center pose is within a tolerance with respect to a first center pose, and adjusts the second center pose when there is a difference between the second center pose and the first center pose.

A non-transitory computer-readable storage medium having data stored therein representing instructions executable by a processor. The processor performs a method comprising determining a first center pose of the electronic device, and determining when a motion of the electronic device is caused by a vehicle. The processor also tracks, using a sensor in conjunction with computer vision operating on a processor, at least one key point within a scene to determine a second center pose. The processor further determines whether the second center pose is within a tolerance with respect to the first center pose; and adjusts the second center pose when there is a difference between the second center pose and the first center pose.

Other features will be recognized from consideration of the Detailed Description and the Claims, which follow.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

DETAILED DESCRIPTION

While the specification includes claims defining the features of one or more implementations of the invention that are regarded as novel, it is believed that the circuits and methods will be better understood from a consideration of the description in conjunction with the drawings. While various circuits and methods are disclosed, it is to be understood that the circuits and methods are merely exemplary of the inventive arrangements, which can be embodied in various forms. Therefore, specific structural and functional details disclosed within this specification are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting, but rather to provide an understandable description of the circuits and methods.

HMD devices typically use an onboard computer or mobile device to render virtual and augmented scenes, but rely on the sensors in the HMD or mobile device for head orientation tracking. That is, such devices do not employ external sensors for head positional tracking. This arrangement can be a problem when traveling in a vehicle and the vehicle changes direction. In the virtual world, the scene will change direction because the HMD believes that a user is turning their head, when in fact, the vehicle is turning. To address this problem, a potential change of direction is detected, and computer vision (CV) techniques can be employed to compensate for the erroneous information that is generated by the vehicle's change in direction. If available, Global Positioning System (GPS) information and path information can be used to predict and refine when to employ the CV techniques.

More particularly, CV techniques can be optimized for azimuth position detection. Further, procedures can be setup to determine when to employ the CV techniques. If GPS information and path information are available, that information can be used to augment prediction and tracking of a turn event. In addition, vehicle movement information associated with a route can also be recorded for reuse or sharing with other HMD users. CV techniques can be employed to measure visual cues that are not part of the vehicle to augment tracking of a turn event. In one embodiment, CV, GPS, and path information are employed to create a VR experience whose movements are tied to the vehicle's movement. Embodiments can also be used in augmented reality (AR) or mixed reality (MR) systems.

Figure 1:
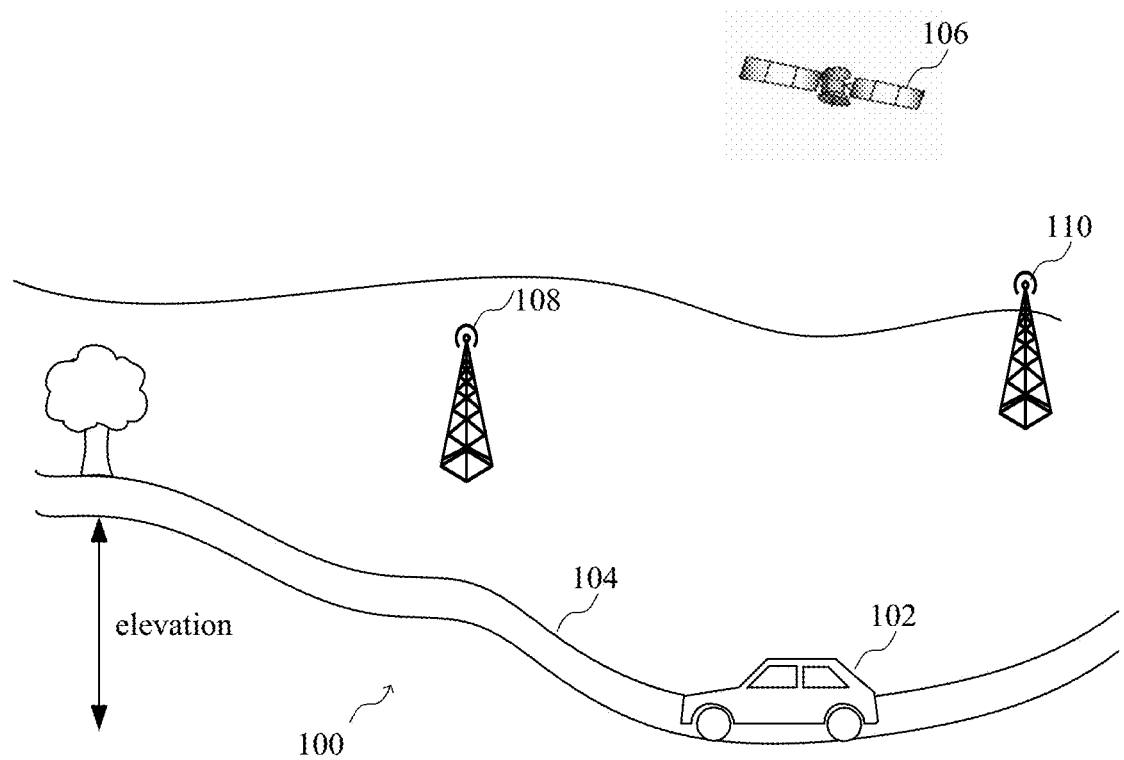
FIG. 1 illustrates an exemplary block diagram of a system for implementing an electronic device.

FIG. 1 illustrates an exemplary block diagram of a system 100 for implementing an electronic device. The system 100 comprises a vehicle 102 travelling along a path 104. It should be noted that the system allows for one or both of the tracking of azimuthal changes of direction and elevational changes of direction. The system may also comprise various wireless communication networks, shown here by way of example as a GPS network having a satellite 106, and a cellular communication network having cellular towers 108 and 110. While the vehicle of FIG. 1 includes an automobile, the system and methods set forth below could be include any type of vehicle, such as a train or a plane for example. It should also be noted that an electronic device, such as an HMD worn by a user inside the vehicle, could receive information from or provide information to an electronic device associated with the vehicle, as will be described in more detail in reference to FIG. 3.

Figure 2:
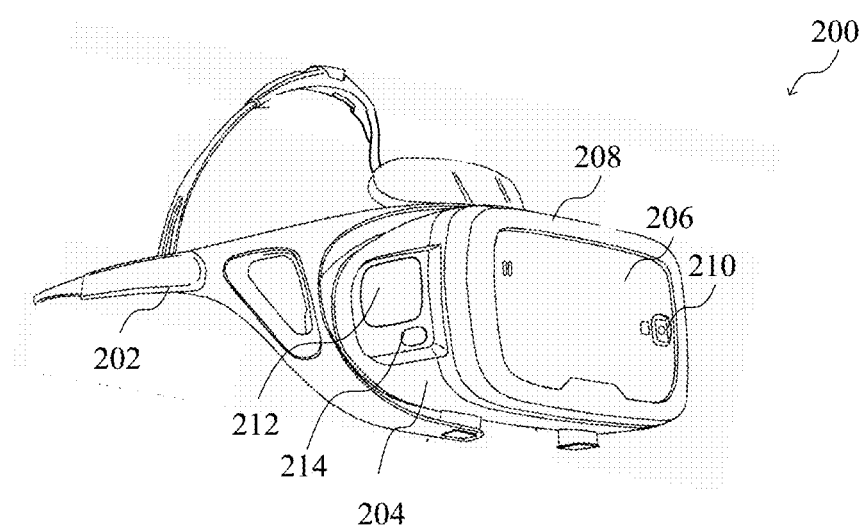
FIG. 2 illustrates an exemplary block diagram of a head-mounted electronic device.

FIG. 2 illustrates an exemplary block diagram of an electronic device, implemented here as a head-mounted electronic device. The head-mounted electronic device 200 of FIG. 2, also known as an HMD, comprises a head mounting element 202 enabling securing a control unit 204 to a user's head. The head mounting element could include straps, adjustable head bands, or attachment members that facilitate securing the HMD to a user's head. The control unit 204 is configured to provide a visual experience on a screen viewed by a user wearing the head-mounted electronic device 200. According to some embodiments, some elements of the head-mounted device may be implemented in a portable electronic device 206, such as a display of a smart phone for example. That is, the elements necessary to implement the circuits and methods set forth below can be implemented in a control unit 204 of the head-mounted electronic device, in the portable electronic device 206, or distributed between the control unit 204 of the head-mounted electronic device and the portable electronic device 206. According to other embodiment, the elements associated with the circuits and methods are implemented in the control unit of an integrated head mounted device that does not require a portable electronic device 206.

An attachment element 208 may be used to secure the portable electronic device 206 to the control unit 204. The attachment element 208 may include a connector mechanism (e.g., microUSB, USB type C, lightning connector, etc.). The attachment element may further include a mechanism to hold the portable electronic device to the HMD. Examples of such mechanisms may include clips, clamps, removable covers, etc. The portable electronic device could be for example a smart phone or other type of wireless communication device having a display. A camera 210, which may be a part of the portable electronic device 206, allows the head-mounted electronic device to function as a virtual reality (VR) device or an augmented reality (AR) device using the camera to pass-through images of the surrounding environment. The HMD may also comprise user interface elements, shown here as a track pad 212 and a control button 214, which may allow a selection operation that depends upon the mode of operation of the HMD.

While an electronic device having a display viewable by a user is shown in FIG. 2 as a head-mounted electronic device, it should be understood that the circuits and elements set forth below could be implemented in an electronic device that does not need to be mounted to the head, but can be held in the hand of the user to provide a visual experience, which may be a VR or an AR experience for example, to a user. Such a device could be a stand-alone device or could have a portable electronic device such as a smartphone.

Figure 3:
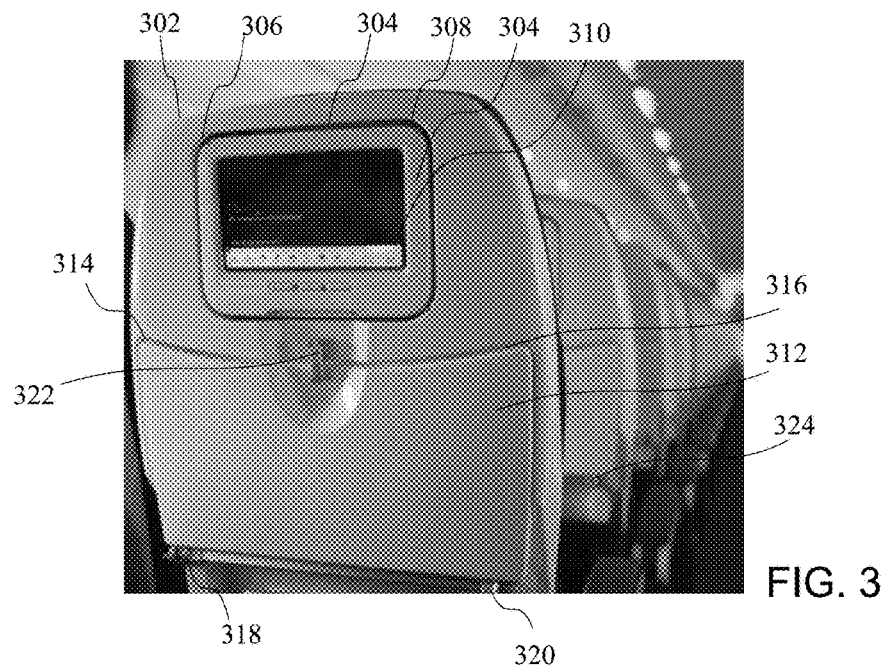
FIG. 3 is an image showing possible key points associated with a view of an airline passenger wearing an HMD.

FIG. 3 is an image showing possible key points associated with a view of an airline passenger wearing an HMD. As shown in FIG. 3, key points associated with one or more seats near a passenger wearing an HMD on an airplane may be selected for the passenger. A seat 302 in front of the passenger may have a display 304, which may include elements that could be key points. For example, corners 306 and 308 of the display or portions of a touchscreen interface 310 shown on the display could be used as key points. A tray table 312 may also have corners 314 and 316 that may be used as key points. Corners 318 and 320 of a hinge of the tray table or a latch 322 for securing the tray table could also be used as key points. A corner 324 of a hinge of another seat could also be used as a key point. It should be noted that the example of key points associated with an airplane is exemplary, and the selection of key points could be made for any other type of vehicle, such as a train or an automobile. The selection of key points is described in more detail below in reference to FIG. 9.

Figure 4:
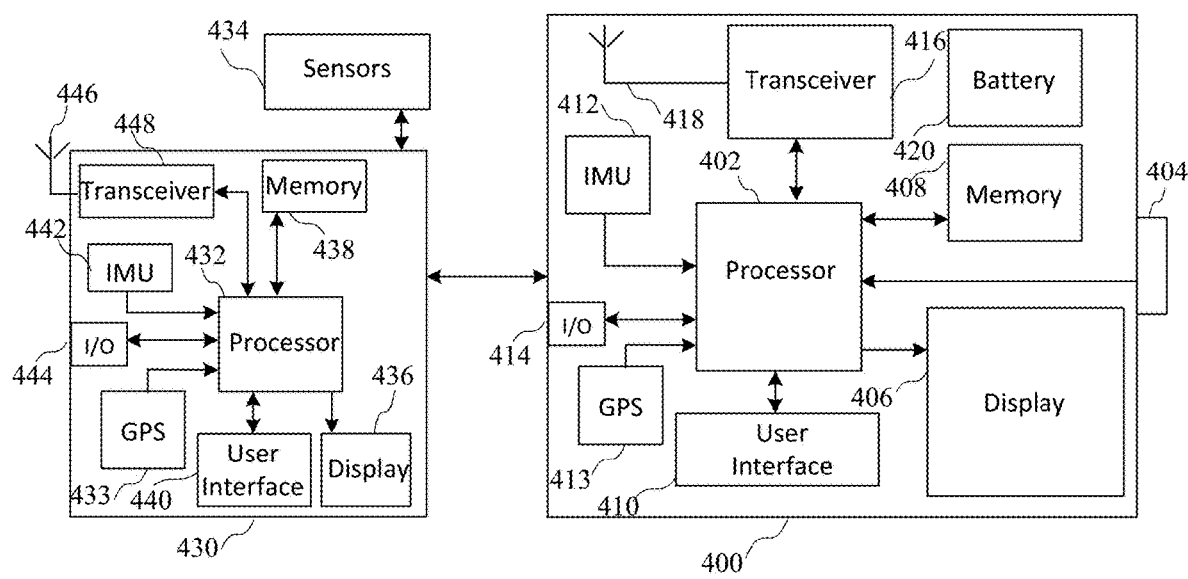
FIG. 4 illustrates an exemplary block diagram of an electronic device and electronic elements of a vehicular system.

FIG. 4 illustrates an exemplary block diagram of an electronic device and electronic elements of a vehicular system. In particular, a device 400, which may be implemented in the head mounted electronic device 200, comprises a processor circuit 402 coupled to an image sensor 404. The processor 402 could be an ARM processor, an X86 processor, a MIPS processor, a graphics processing unit (GPU), a general purpose GPU, or any other processor configured to execute instructions stored in a memory. The processor 402 could be implemented in one or more processing devices, where the processors may be different. For example, the electronic device could include a central processing unit (CPU) as well as a GPU for example. The processor implements an operating system (OS) that accesses software on the memory and receives various inputs, such as readings from the IMU and a sensor, such as a camera for example, to allow for the correction of a vehicle induced change of direction, as will be described in more detail below. The device 400 could be any type of device, or a component such as an integrated circuit of a device or system, adapted to capture a digital image. The image sensor 404 could be a digital camera, or any portion of a digital camera, such as a lens or other image sensing element. While a single image sensor is shown, it should be understood that multiple sensors and could include any type of sensor that could be used to detect key points in a scene. The processor circuit could be coupled to a display 406 for displaying a captured image, and more particularly, displaying a digital image. The processor circuit, alone or in combination with other elements, can be used to correct a vehicle induced change of direction in an electronic device.

The processor circuit 402 may also be coupled to a memory 408 that allows storing information related to various frames of an image, or resulting digital images associated with an AR or a VR image. The memory 408 could be implemented as a part of the processor circuit 402, or could be implemented in addition to any cache memory of the processor, as is well known. The memory 408 could include any type of memory, such as a solid-state drive (SSD), Flash memory, Read Only Memory (ROM) or any other memory element that provides long term memory, where the memory could be any type of internal memory of the electronic drive or external memory accessible by the electronic device. The processor 402 could implement open CV software tools or other suitable software tools stored on the memory and accessible by the processor for enabling computer vision. A user interface 410, which may be separate from the display, or which may be a part of, or responsive to, the display, is also shown. The user interface 410 may comprise both graphical and physical user interface elements, where the graphical user interface may comprise a touch screen display implemented as display 406, which may be used before the HMD is attached to the head. The physical user interface may comprise elements that allow providing data or other information to the electronic device, such as the touchpad 212 and the control button 214, or other elements such as a microphone, a mouse, or a keypad, where the mouse or keypad could be a wired or wireless device for example. The processor circuit 402 may also be coupled to other elements that receive inputs or allow for the capturing of a digital image or displaying an AR or VR image. For example, a motion sensor, such as an inertial measurement unit (IMU) 412, can provide various information related to the motion or orientation of the device 400. The IMU 412 could include an accelerometer and a gyroscope for example. The processor circuit 402 may also receive input by way of an input/output (I/O) port 414 or a transceiver 416 coupled to an antenna 418. The I/O port 414 may be any interface element adapted to interface with external physical user interface elements, such as an external keyboard or mouse, by way of a wired or wireless connection for example. A battery 420 may be implemented to provide power to the processor and other elements of the device 400.

According to one implementation, a device 430 associated with a vehicle could provide data to or receive data from device 400. A device 430 comprises a processor circuit 432 could be implemented as a part of the vehicle in which the user of an electronic device, such as an HMD, is travelling. The processor circuit 432 could also be an ARM processor, an X86 processor, a MIPS processor, a graphics processing unit (GPU), a general purpose GPU, or any other processor configured to execute instructions stored in a memory. The processor 432 could be implemented in one or more processing devices, where the processors may be different. The processor implements an operating system (OS) that accesses software on the memory and receives various inputs, such as readings from the IMU and a sensor, such as a camera for example. The device 430 could be any type of device, or a component such as an integrated circuit of a device or system associated with a vehicle. The device 430 could comprise a GPS circuit 433 and one or more sensors 434. The sensor 434 could include a digital camera, or any portion of a digital camera, such as a lens or other image sensing element. While a single sensor is shown, it should be understood that multiple sensors and could include any type of sensor that could be used to detect key points in a scene. The sensor 434 could also be a wearable sensor separate from the device 400 and the vehicle, such as sensor associated with a smart watch or other wearable device. The processor circuit could be coupled to a display 436 for displaying a captured image, and more particularly, displaying a digital image.

The processor circuit 432 may also be coupled to a memory 438 that allows storing information. The memory 438 could be implemented as described in reference to device 400. A user interface 440, which may be separate from the display, or which may be a part of, or responsive to, the display, is also shown. The user interface 440 may comprise both graphical and physical user interface elements, where the graphical user interface may comprise a touch screen display implemented in the vehicle. The processor circuit 432 may also be coupled to other elements that receive inputs associated with the operation of the vehicle system. The device 430 may also comprise and IMU 442 associated with the vehicle. The processor circuit 432 may also receive input by way of an input/output (I/O) port 444 or a transceiver 446 coupled to an antenna 448. The I/O port 444 may be any interface element adapted to interface with external physical user interface elements by way of a wired or wireless connection for example. By way of example, path information associated with a vehicle that may be entered on a vehicle navigation system could be received at the device 400 from the device 430 associated with the vehicle to allow path information to be used to correct a vehicle induced change of direction in device 400.

Figure 5:
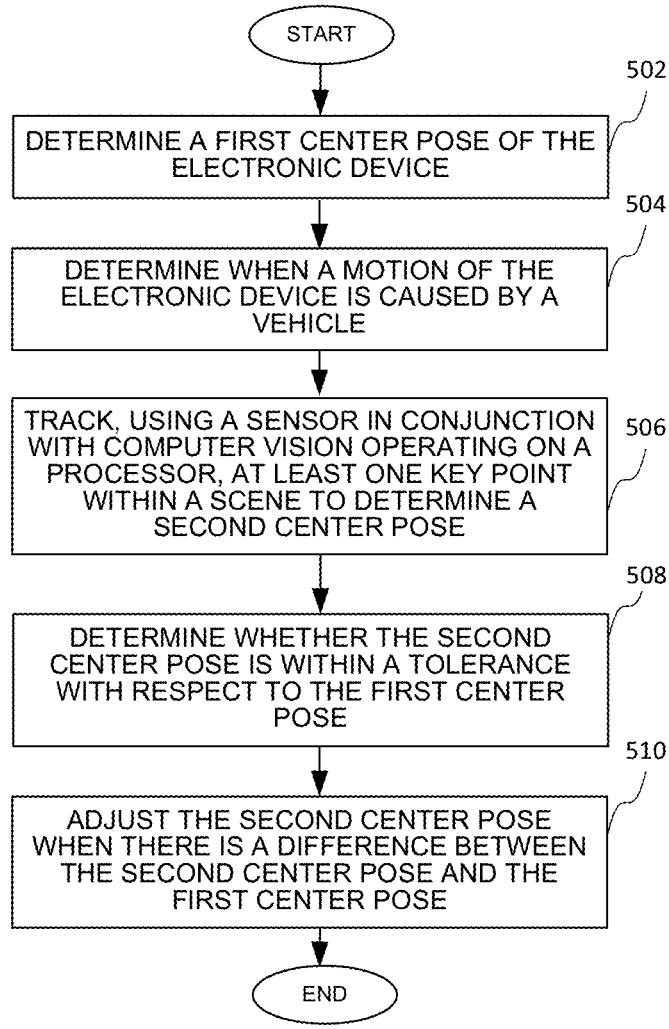
FIG. 5 illustrates an exemplary flow chart showing a method of correcting for a vehicle induced change of direction in an electronic device.

FIG. 5 illustrates an exemplary flow chart showing a method of correcting for a vehicle induced change of direction in an electronic device. A first center pose of the electronic device is determined at block 502. The first center pose could be determined when a user of the HMD places the HMD on their head. It is then determined when a motion of the electronic device is caused by a vehicle at block 504. This can be determined based upon an accumulation filtering of a plurality of head poses, or by GPS information or known path information, as will be described in more detail in reference to block 913 below. At least one key point within a scene is then tracked, using a sensor in conjunction with computer vision operating on a processor, to determine a second center pose at block 506. That is, after it is determined that the motion, which may include a change of direction, of the head is caused by the vehicle, CV techniques may be implemented to correct of the vehicle induced change or direction. It is then determined whether the second center pose is within a tolerance with respect to the first center pose at block 508. If the second center pose is outside of a tolerance, in which case key points are not identified, it may not be possible to correct the second center pose, and new key points would need to be selected. Assuming that the second center pose is within the tolerance, the second center pose is adjusted when there is a difference between the second center pose and the first center pose at block 510.

Figure 6:
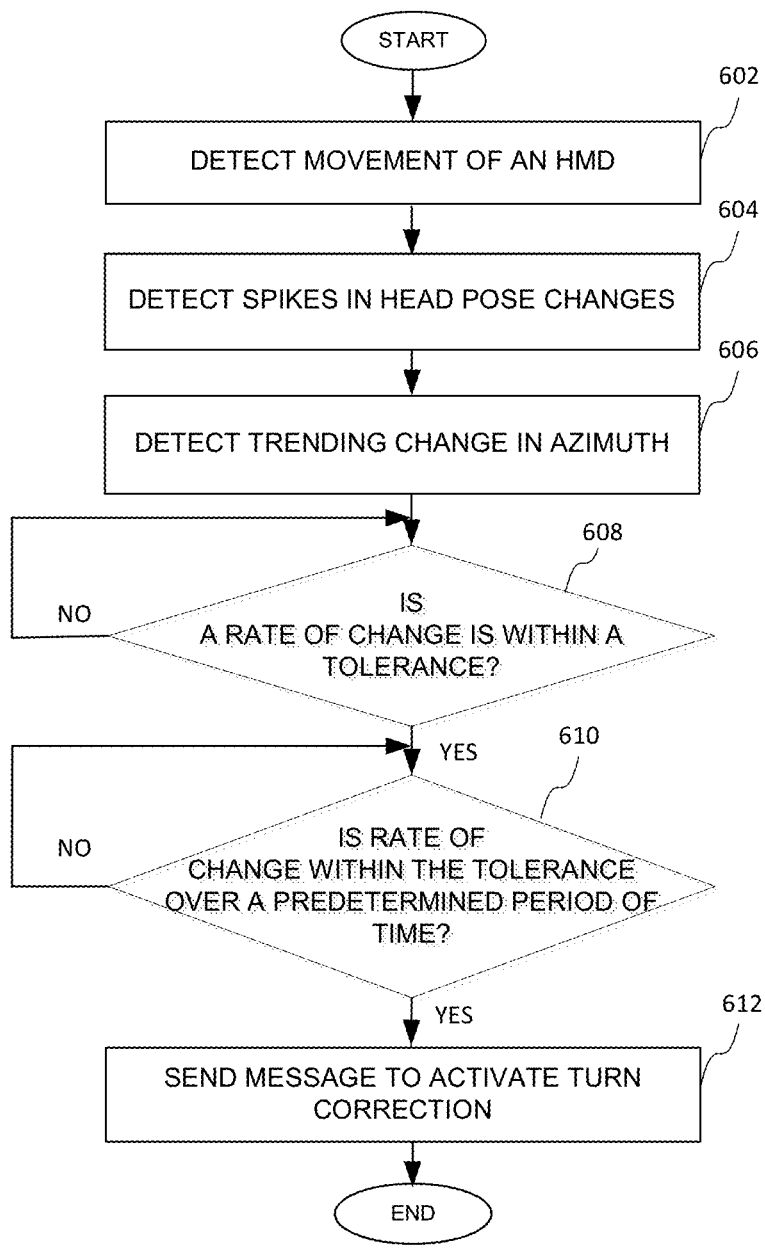
FIG. 6 illustrates an exemplary a flow chart showing a method of detecting a condition to activate turn correction.

According to one implementation, a determination can be made that a motion of an electronic device is caused by a vehicle by performing an accumulation filtering of a plurality of HMD poses. That is, FIG. 6 illustrates an exemplary a flow chart showing a method of detecting a condition to allow turn correction based upon accumulation filtering. A change of HMD orientation is detected at block 602. Spikes in head pose changes are detected at block 604. Trending changes in azimuth are then detected at block 606. For example, filtering and averaging can be performed in an accumulated filtering process. An accumulation of all of the head poses should indicate whether the head pose is at the center pose. It is then determined if a magnitude of change is within tolerance at block 608. For example, it may be determined whether a change is within a 3 degrees/second, which would indicate a slow moving turn associated with a turning of a vehicle rather that a turning of the head which would likely occur at a faster rate that 3 degrees/second. It is also determined if a rate is within tolerance over a set time at block 610. For example, it may be determined if the rate of change of 3 degrees/second is sustained over approximately 10 seconds, which would indicate that a vehicle is likely in a turn. A message is then sent to activate turn correction at block 612. The method of FIG. 6 could be implemented according to block 913 with other elements of a method of correcting a vehicle induced change of direction as described in FIG. 9.

Figure 7:
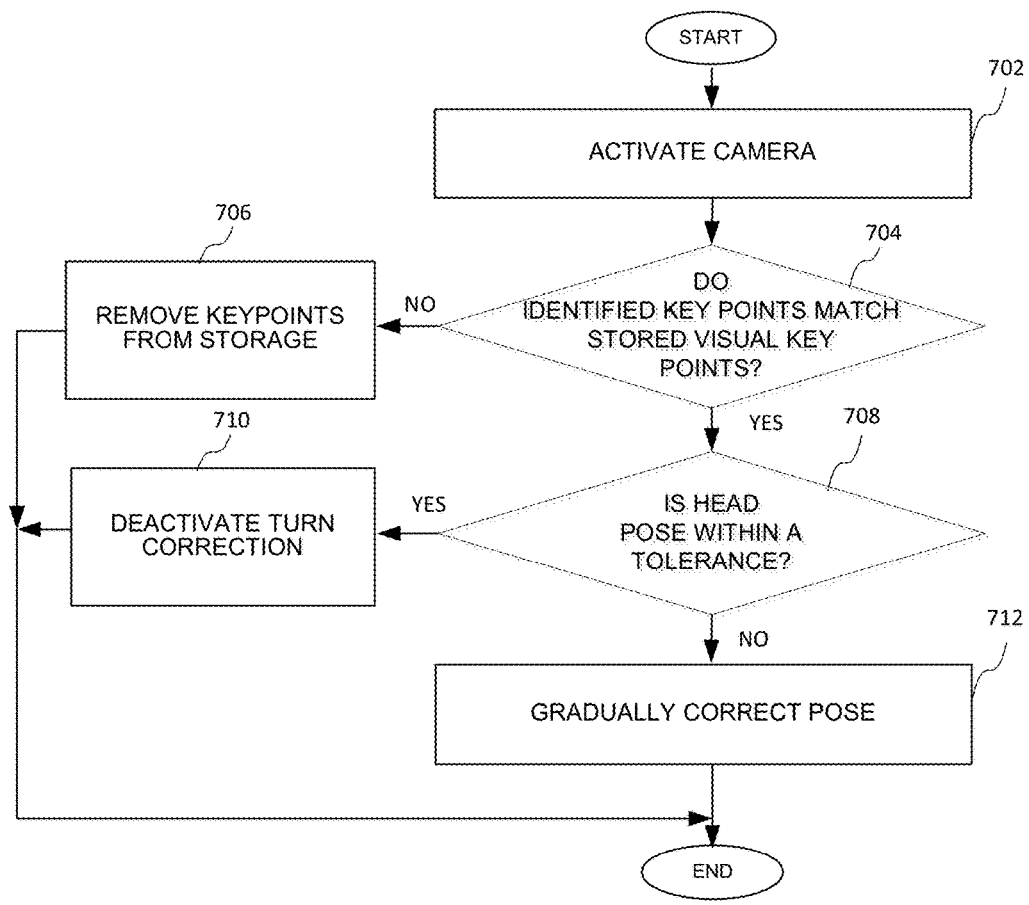
FIG. 7 illustrates an exemplary flow chart showing a method of using computer vision to correct a pose during turn correction.

FIG. 7 illustrates an exemplary flow chart showing a method of using computer vision to correct a pose during turn correction. That is, if it is determined that a change of direction may be induced by the motion or turning of a vehicle, CV techniques can be applied to correct for the vehicle induced turn. The camera is activated at block 702, and it is then determined whether identified key points match stored visual key points at block 704. If not, the key points are removed from storage at block 706, and new key points may then be determined. It is also determined whether the HMD pose within a tolerance at block 708. If it is not, the CV techniques to correct for the vehicle induced turn may be inactivated. However, if the HMD pose is within a tolerance, turn correction is activated at block 710, and the pose is gradually corrected at block 712. The method of FIG. 7 could be implemented according to block 929 with other elements of a method of correcting a vehicle induced change of direction as described in FIG. 9.

Figure 8:
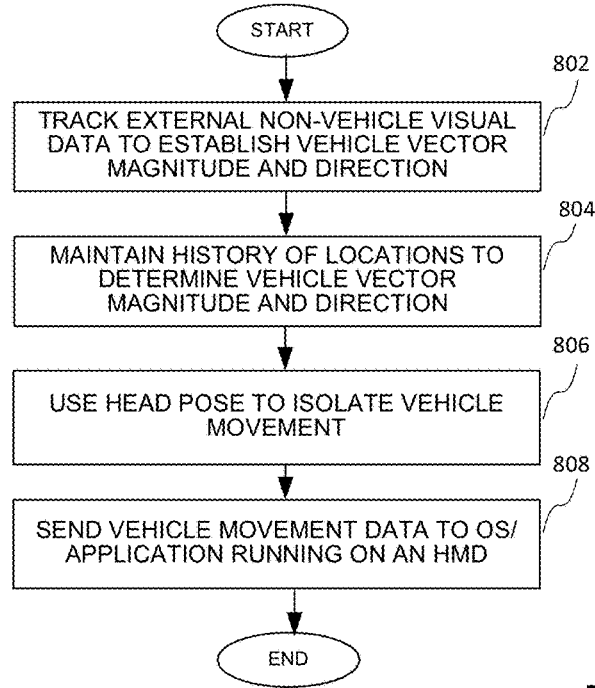
FIG. 8 illustrates an exemplary flow chart showing a method of establishing vehicle movement data.

A history may also be used to implement the correction of a vehicle induced turn. FIG. 8 illustrates an exemplary flow chart showing a method of establishing vehicle movement data. External non-vehicle visual data is tracked to establish vehicle vector magnitude and direction at block 802. The history could be based for example on GPS data for example. A history of locations is maintained to determine vehicle vector magnitude and direction at block 804. Head pose is used to isolate vehicle movement at block 806. Vehicle movement data is sent to OS/Application at block 808. The method of FIG. 8 could be implemented according to block 941 of FIG. 9 with other elements of a method of correcting a vehicle induced change of direction as described in FIG. 9.

Figure 9:
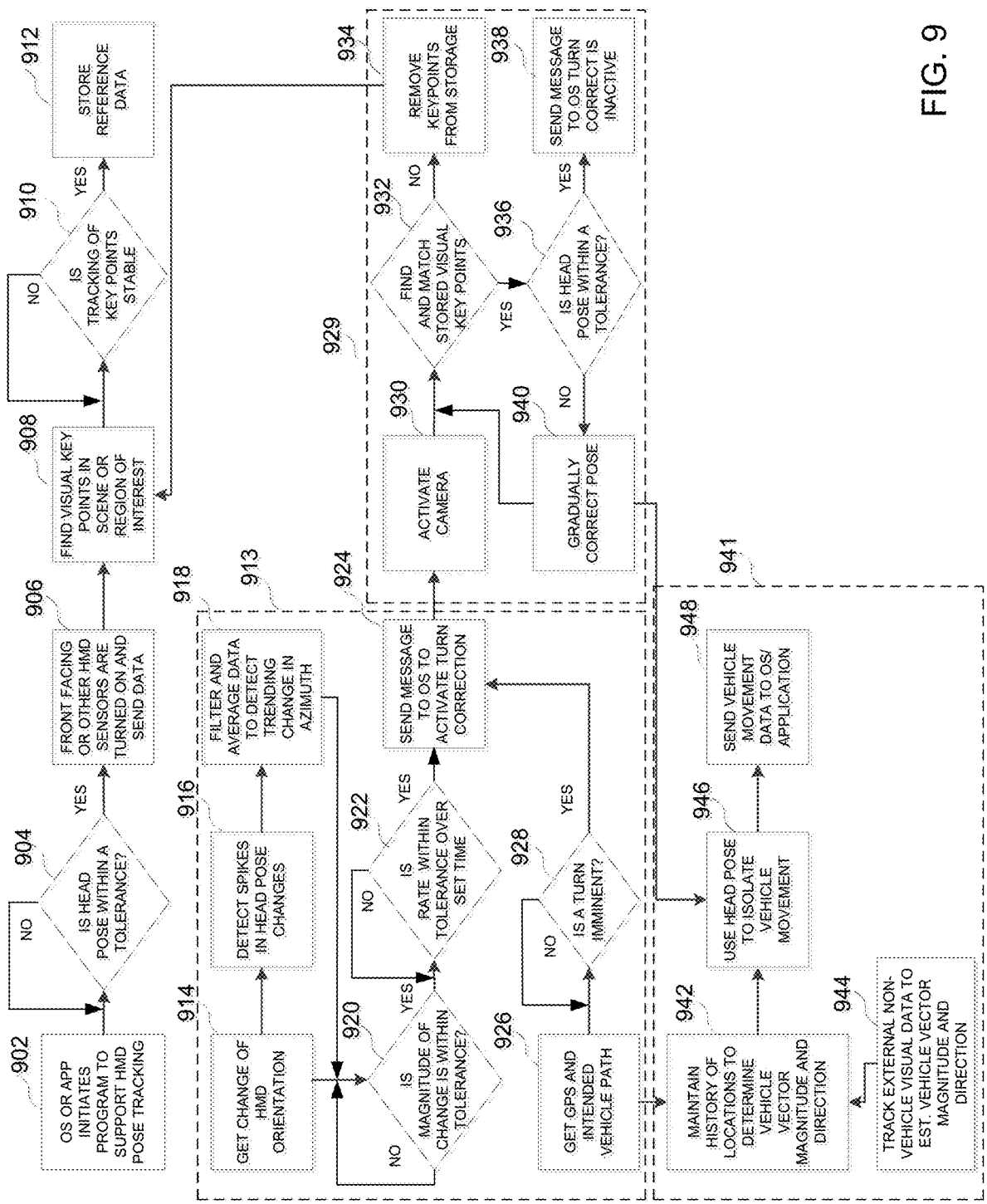
FIG. 9 illustrates an exemplary flow chart showing another method of correcting for a vehicle induced change of direction in an electronic device.

FIG. 9 illustrates an exemplary flow chart showing another method of correcting for a vehicle induced change of direction in an electronic device. An operating system (OS) or an application (app) implemented on the electronic device initiates a program to support HMD pose tracking at block 902, where the HMD pose tracking allows correction for a vehicle induced change of direction in an electronic device.

In one embodiment, the computer vision techniques used for correcting for a vehicle induced change of direction can be turned on by default from the operating system (OS) of the electronic device, initiated by an app, or initiated by the user (e.g., initiated when the user puts the device in a particular mode, such as an airplane mode for example). Once the program is initialized, a reported center pose is provided by the OS. This reported center pose is the HMD pose when a user of the HMD is looking straight ahead. It is then determined if the HMD pose is within an offset tolerance at block 904. For example, it may be determined whether the pose is within a tolerance with respect to the reported center pose. If not, the system waits until the HMD pose is within a tolerance. That is, the system waits until the user is looking straight ahead again before selecting key points that may be used when correcting for a vehicle induced change of direction.

Visual key points in a scene or region of interest of the display of the HMD are then found at block 908. Using computer vision techniques, for example, at least one key point can be discovered and tracked within the scene. The key points can be, for example, edges of an object within the scene. When the head pose is within the tolerance, the front facing or other HMD sensors are turned on and send data at block 906. For example, the CV system on the HMD tracks specific key points in the user's environment, such as the key points on the seat in front of the passenger in FIG. 3. Based on the movement of these key points, the user's HMD motion can be calculated separately from the vehicle's movements that would be identified in the other sensor data (e.g., the IMU). It is then determined if the tracking of key points in the scene are stable at a block 910. If so, reference data associated with the key points is stored at block 912.

Key points can be determined to be stable once enough key points have been tracked at a high enough level of confidence and are not inconsistent with IMU data. The level of confidence can be considered high, for example, when the key points are checked multiple times (e.g., 100 times) and the key points appear in substantially the same place. By way of example, the IMU data and the key points can be considered consistent when the IMU data indicates that there was no head movement (i.e. within tolerance) and the key points are in substantially the same place (i.e. within tolerance).

An exemplary process for determining whether to implement CV techniques to correct for vehicle induced change of direction in an electronic device is shown in block 913. In particular, a change of HMD orientation is received at block 914. Spikes in head pose changes are detected at block 916. Data associated with the detected head pose changes may then be filtered and averaged to detect trending changes in an azimuthal direction of the HMD at block 918.

It is then determined, at block 920, whether a magnitude of a change is within a tolerance, based upon the change of HMD orientation at block 914 or a detected trending change in the azimuthal direction of the HMD at block 918. If the magnitude of change is not within a tolerance (i.e. the head is moving faster than would normally be associated with a turning of a vehicle), it is then determined if the rate is not within the tolerance over a set period of time at block 922. That is, if a vehicle is turning, it will likely be in the turn for an extended period of time. If the rate is not within the tolerance over the set period of time, a message will be sent to the OS to activate turn correction at block 924. By way of example, a magnitude of change can be calculated based on change of direction rate over time. If change of direction is within set tolerances, for example, between 1-3 degrees/second over 3 seconds, correction to a vehicle induced change of direction using CV techniques is invoked. This correction will continue to run until the condition is no longer true. Since we are looking for a gradual extended turn, normal head movement can be filtered out through the use of spike value filtering. Spike value filtering is a process where head pose changes in azimuth that exceeds a preset degree over time, for example, over 10 degrees per second, is tracked as a highly probable true movement of the head. All values that are tracked as highly probable are monitored such that the averaging and filtering of all these movements can still indicate a smooth movement that would fit in the vehicle direction change profile.

Alternatively, one or both of GPS data and an intended vehicle path can be received at block 926, to allow the HMD to determine whether a turn is imminent at block 928. The path information could be path information entered by a user on a smart phone, for example, or could be received from the vehicle. If a turn is imminent, a message will also be sent to the OS to activate the correction of the vehicle induced change of direction at block 924. Optionally, the OS, the application, or the user can place the application in an "always on" mode, where the CV techniques enabling the correction of a vehicle induced change of direction are constantly running regardless of change of direction. Optionally, an exception to the continuous running correction would be where the HMD is in a steady front and center state and little to no azimuth movement is detected. This exception will save on power and computing resources. A further exception could be where movement spikes are detected and the HMD returned to front and center within a set tolerance, for example, 3 seconds. It is important to note that, even if the turn correction is activated while no turning event is taking place, the azimuth changes induced by head movement will not adversely affect the operation because the CV tracking of the external reference scene will agree with the IMU data.

If GPS and path information is available, that information can be used to augment and further improve turn prediction, tracking, and accuracy. More particularly, that information can allow for a VR experience that is tied to the vehicle's movement. For example, a VR environment can use movements of the vehicles to move the user through the environment by detecting forward and lateral movements as well as changes in azimuth and elevation.

After turn correction is activated, CV techniques can be implemented to allow the correction for a vehicle induced change of direction in an electronic device, as shown in block 929. If a camera or other sensor enabling CV techniques is not activated, it will be activated at block 930. It is then determined whether a match with stored visual key points is found at block 932. If not, the remote key points are removed from storage at block 934, and the new key points are found in the scene or region of interest at block 908. If the identified key points match the stored key points, it is then determined whether the head pose is within a tolerance at block 936. If the head pose is within a tolerance, a message is sent to the OS to inactivate the turn correction at block 938. However, if the head pose is not within the tolerance at block 936, the pose is gradually corrected at block 940. That is, the error may be constantly recalculated until the error is below a tolerance. For example, the error can be slowly adjusted by 0.5° until the error is corrected.

A history associated with a change in location of a vehicle can also be maintained to allow the correction of a vehicle induced change of direction at block 941. Such a history may be beneficial if GPS information or intended vehicle path is not available. A history of locations is maintained to determine vehicle vector magnitude and direction at block 942. External non-vehicle visual data may be tracked at block 944 to estimate vehicle vector magnitude and direction, which can be included in the history maintained at block 942. The head pose can be used to isolate vehicle movement at block 946, where the head pose may be updated based upon the corrected pose at block 940. Vehicle movement data can be sent to the OS and application enabling the correction at block 948. By way of example, it should be noted that the methods of FIGS. 5-9 could be implemented using any of the circuits and systems set forth above, or other suitable circuits or systems, and may be implemented using a computer accessing a non-transitory computer-readable storage medium having data stored therein to perform the various elements of the methods.

It can therefore be appreciated that new devices for and methods of correcting for a vehicle induced change of direction through computer vision techniques have been described. It will be appreciated by those skilled in the art that numerous alternatives and equivalents will be seen to exist that incorporate the disclosed invention. As a result, the invention is not to be limited by the foregoing embodiments, but only by the following claims.

We claim:

1. A method to correct for a vehicle induced change of direction in an electronic device, comprising:
   determining a first center pose of the electronic device;
   detecting a motion of the electronic device;
   determining that the motion of the electronic device is caused by a vehicle when a magnitude of change of an orientation of the electronic device is within a tolerance over a predetermined period of time;
   activating turn correction after determining that the motion of the electronic device is caused by the vehicle;
   tracking, using a sensor in conjunction with computer vision operating on a processor, at least one key point within a scene to determine a second center pose;
   determining whether the second center pose is within a tolerance with respect to the first center pose;
   removing the at least one key point when the second center pose is outside of the tolerance with respect to the first center pose; and
   adjusting, when the second center pose is within the tolerance with respect to the first center pose, the second center pose when there is a difference between the second center pose and the first center pose.

2. The method of claim 1 further comprising determining that the motion of the electronic device is caused by the vehicle by determining when the vehicle is following an intended path.

3. The method of claim 2 further comprising determining when a turn is imminent, wherein the tracking the at least one key point is performed when the turn is imminent.

4. The method of claim 1 further comprising determining that the motion of the electronic device is caused by the vehicle by evaluating a GPS signal.

5. The method of claim 1 further comprising determining that the motion of the electronic device is caused by the vehicle by determining when a turning of the electronic device is caused by the turning of the vehicle.

6. The method of claim 5 further comprising determining whether a rate of change of the turning of the vehicle is within a tolerance.

7. The method of claim 6 further comprising performing an accumulation filtering of a plurality of HMD poses.

8. An electronic device, comprising:
   a display;
   a sensor configured to track at least one key point within a scene;
   a processor coupled to the display and the sensor, the processor configured to:
   detect a motion of the electronic device;
   determine that the motion of the electronic device is caused by a vehicle when a magnitude of change of an orientation of the electronic device is within a tolerance over a predetermined period of time;
   activate turn correction after determining that the motion of the electronic device is caused by the vehicle;
   track, using the sensor in conjunction with computer vision operating on the processor, the at least one key point within the scene to determine a second center pose;
   determine whether the second center pose is within a tolerance with respect to a first center pose;
   remove the at least one key point when the second center pose is outside of the tolerance with respect to the first center pose; and
   adjust, when the second center pose is within the tolerance with respect to the first center pose, the second center pose when there is a difference between the second center pose and the first center pose.

9. The electronic device of claim 8 wherein the processor is further configured to determine that the motion of the electronic device is caused by the vehicle by determining that the vehicle is following an intended path.

10. The electronic device of claim 9 wherein the processor is further configured to determine when a turn is imminent, and perform tracking the at least one key point when the turn is determined to be imminent.

11. The electronic device of claim 8 wherein the processor is further configured to determine that a motion of the electronic device is caused by a vehicle by evaluating a GPS signal.

12. The electronic device of claim 8 wherein the processor is further configured to determine that the motion of the electronic device is caused by the vehicle by determining when a turning of the electronic device is caused by a turning of the vehicle.

13. The electronic device of claim 12 wherein the processor is further configured to determine whether a rate of change of the turning of the vehicle is within a tolerance.

14. The electronic device of claim 13 further comprising performing an accumulation filtering of a plurality of HMD poses.

15. A non-transitory computer-readable storage medium having data stored therein representing instructions executable by a processor to perform a method comprising:
   determining a first center pose of the electronic device;
   detecting a motion of the electronic device;
   determining that the motion of the electronic device is caused by a vehicle when a magnitude of change of an orientation of the electronic device is within a tolerance over a predetermined period of time;
   activating turn correction after determining that the motion of the electronic device is caused by the vehicle;
   tracking, using a sensor in conjunction with computer vision operating on a processor, at least one key point within a scene to determine a second center pose;
   determining whether the second center pose is within a tolerance with respect to the first center pose;
   removing the at least one key point when the second center pose is outside of the tolerance; and
   adjusting, when the second center pose is within the tolerance with respect to the first center pose, the second center pose when there is a difference between the second center pose and the first center pose.

16. The non-transitory computer-readable storage medium of claim 15 further comprising determining when a motion of the electronic device is caused by the vehicle by determining that the vehicle is following an intended path.

17. The non-transitory computer-readable storage medium of claim 16 further comprising determining when a turn in imminent, wherein the tracking the at least one key point is performed when the turn is imminent.

18. The non-transitory computer-readable storage medium of claim 15 further comprising determining that the motion of the electronic device is caused by the vehicle by evaluating a GPS signal.

19. The non-transitory computer-readable storage medium of claim 15 further comprising determining that the motion of the electronic device is caused by the vehicle by determining when a turning of the electronic device is caused by a turning of the vehicle.

20. The non-transitory computer-readable storage medium of claim 19 further comprising determining whether a rate of change of the turning of the vehicle is within a tolerance.

21. The non-transitory computer-readable storage medium of claim 20 further comprising determining that the motion of the electronic device is caused by the vehicle by performing an accumulation filtering of a plurality of HMD poses.

* * * * *